United States Patent [19]  
Olson

[11] 4,253,362  
[45] Mar. 3, 1981

[54] APPARATUS FOR COLLECTING SAWDUST PRODUCED BY A CIRCULAR POWER SAW

[76] Inventor: Larry E. Olson, 1149 129th Ave., NE., Blaine, Minn. 55434

[21] Appl. No.: 65,835

[22] Filed: Aug. 13, 1979

[51] Int. Cl.³ .............................................. B27B 5/29
[52] U.S. Cl. .................................. 83/100; 29/DIG. 86; 144/252 R
[58] Field of Search ........................ 83/100, 169, 478; 144/252 R, 252 A; 51/273, 267; 29/DIG. 86

[56] References Cited

U.S. PATENT DOCUMENTS

| | | | |
|---|---|---|---|
| 396,934 | 1/1889 | Hutchinson | 144/252 |
| 994,430 | 6/1911 | Tunks | 144/252 |
| 2,394,556 | 2/1946 | Martin | 51/273 |
| 2,899,781 | 8/1959 | Williams | 51/267 |
| 3,126,021 | 3/1964 | May | 51/273 |
| 3,334,451 | 8/1967 | Hutton | 51/267 |
| 3,786,846 | 1/1974 | Mehring | 83/100 |

Primary Examiner—J. M. Meister  
Assistant Examiner—K. Bradford Adolphson  
Attorney, Agent, or Firm—Peterson, Palmatier, Sturm & Sjoquist, Ltd.

[57] ABSTRACT

A guard casing encloses a substantial portion of the blade of a circular power saw. A cylindrical tube is carried by the casing for connection to a source of vacuum, the cylindrical tube having a slot extending longitudinally from one end thereof for accommodating therein a peripheral segment of the saw blade so that the sawdust produced by the blade is more efficiently collected. The cylindrical tube is adjustably mounted so that its slot can be appropriately positioned relative to the saw blade.

5 Claims, 6 Drawing Figures

APPARATUS FOR COLLECTING SAWDUST PRODUCED BY A CIRCULAR POWER SAW

BACKGROUND OF THE INVENTION

1. Field of the Invention

This invention relates generally to circular power saws, and pertains more particularly to a dust collection system therefor.

2. Description of the Prior Art

Various bonnets, shrouds and hoods have been utilized in conjunction with power saws of various descriptions. For the most part, these devices enshroud the entire power saw and the dust is induced to enter a discharge port in the casing for removal via a flexible hose, there being a vacuum cleaner or other source of vacuum attached to the opposite or remote end of the hose. The difficulty with prior art devices, generally speaking, is that the casing cannot completely enclose the circular saw blade and thus a considerable amount of sawdust can escape into the surrounding environment which appreciably detracts from the previously-used arrangements. The problem is compounded by reason of the need for viewing the work being cut with the particular power saw, thereby providing space through which the sawdust exists without being drawn into the vacuum system.

SUMMARY OF THE INVENTION

Accordingly, one important object of my invention is to effectively and efficiently collect the sawdust produced from a rotating circular saw blade, thereby minimizing the amount of dust that escapes into the surrounding atmosphere.

Another object of the invention is to provide apparatus for effectively removing the sawdust resulting from the use of a power-driven circular saw that will not obscure the work at the location where the saw cut is being made.

Still another object of the invention is to provide apparatus for collecting dust caused from the use of a circular power saw that lends itself readily to employment with conventional sheet board cutting machines.

Yet another object of the invention is to provide apparatus for effectively removing sawdust caused by a circular power saw that will not interfere with the portability and maneuverability of the equipment supporting the power saw.

Still further, an object of my invention is to provide an attachment or apparatus for collecting dust at a location closely adjacent the circular saw blade which will be inexpensive to manufacture, thereby encouraging its widespread use.

My invention has for still an additional object the provision of apparatus for collecting sawdust from a circular power saw which will not interfere with the guard casing. Stated somewhat differently, an aim of the invention is to retain all of the safety aspects of attachments or apparatus currently being employed, and at the same time permit the efficient removal of the sawdust prior to its escaping into the surrounding air.

Briefly, my invention envisages the utilization of a guard casing which carries an adjustable tube having a slot extending longitudinally from one end thereof. The slot permits the accommodation or reception of a peripheral or segmental portion of the circular saw blade so that the sawdust produced as the blade performs its cutting action is immediately drawn into the tube and passes therethrough to a source of vacuum, such as a tank-type vacuum cleaner. Provision is made for positioning the slotted tube so that it is closely adjacent the saw blade, thereby increasing its effectiveness irrespective of the diameter of the particular blade. Furthermore, it is contemplated that the slotted tube be made of transparent plastic so that the work being cut will not be obscured.

BRIEF DESCRIPTION OF THE DRAWINGS

FIG. 6 is an exploded perspective view showing the guard casing which normally carries the slotted tube via which the sawdust is discharged, the slotted tube being separated from the casing so as to illustrate with greater particularity the slot extending longitudinally from one end thereof.

DESCRIPTION OF THE PREFERRED EMBODIMENT

Figure 1:
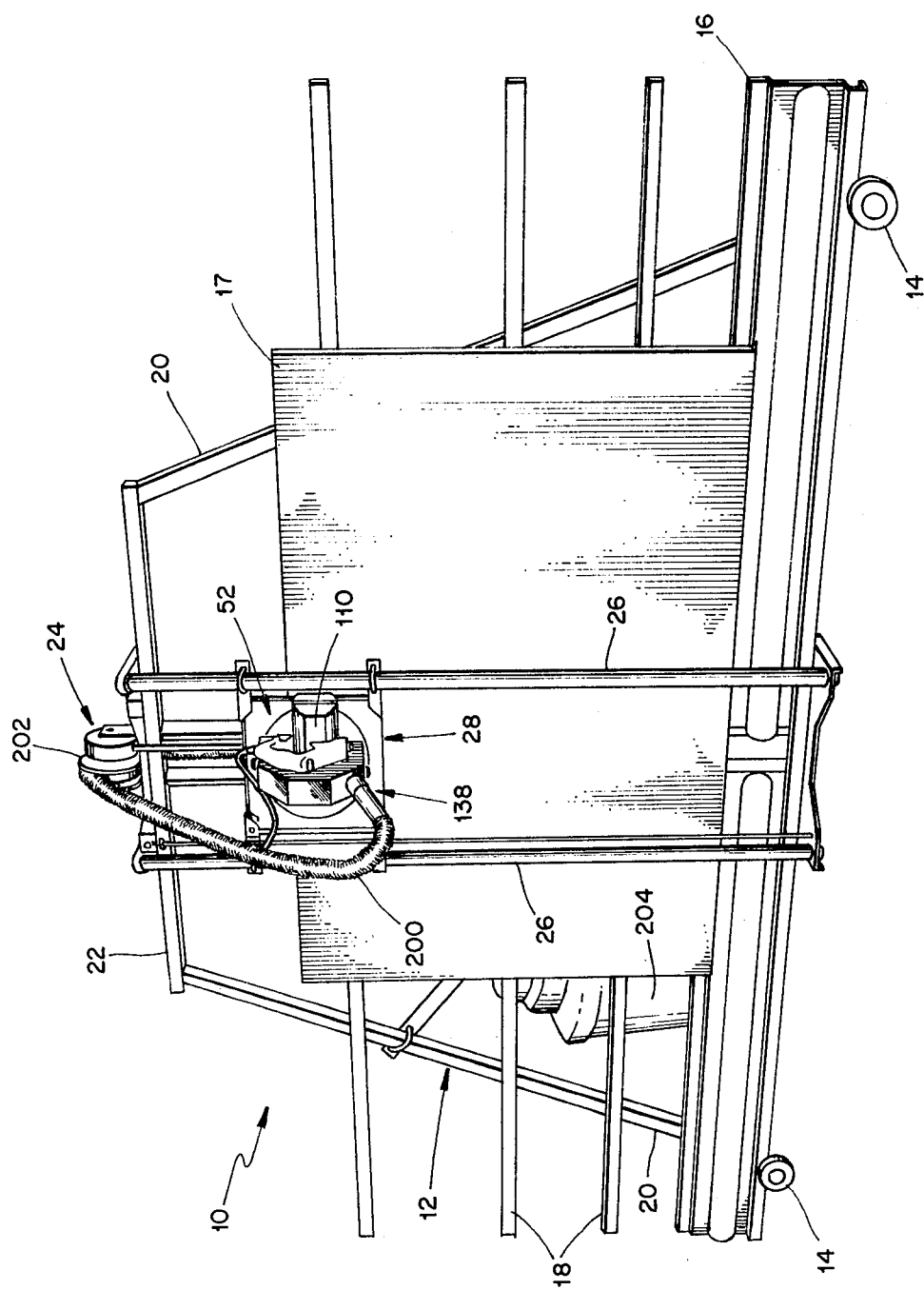
FIG. 1 is a perspective view of a typical sheet board cutting machine having my dust collecting apparatus mounted thereon.
Figure 2:
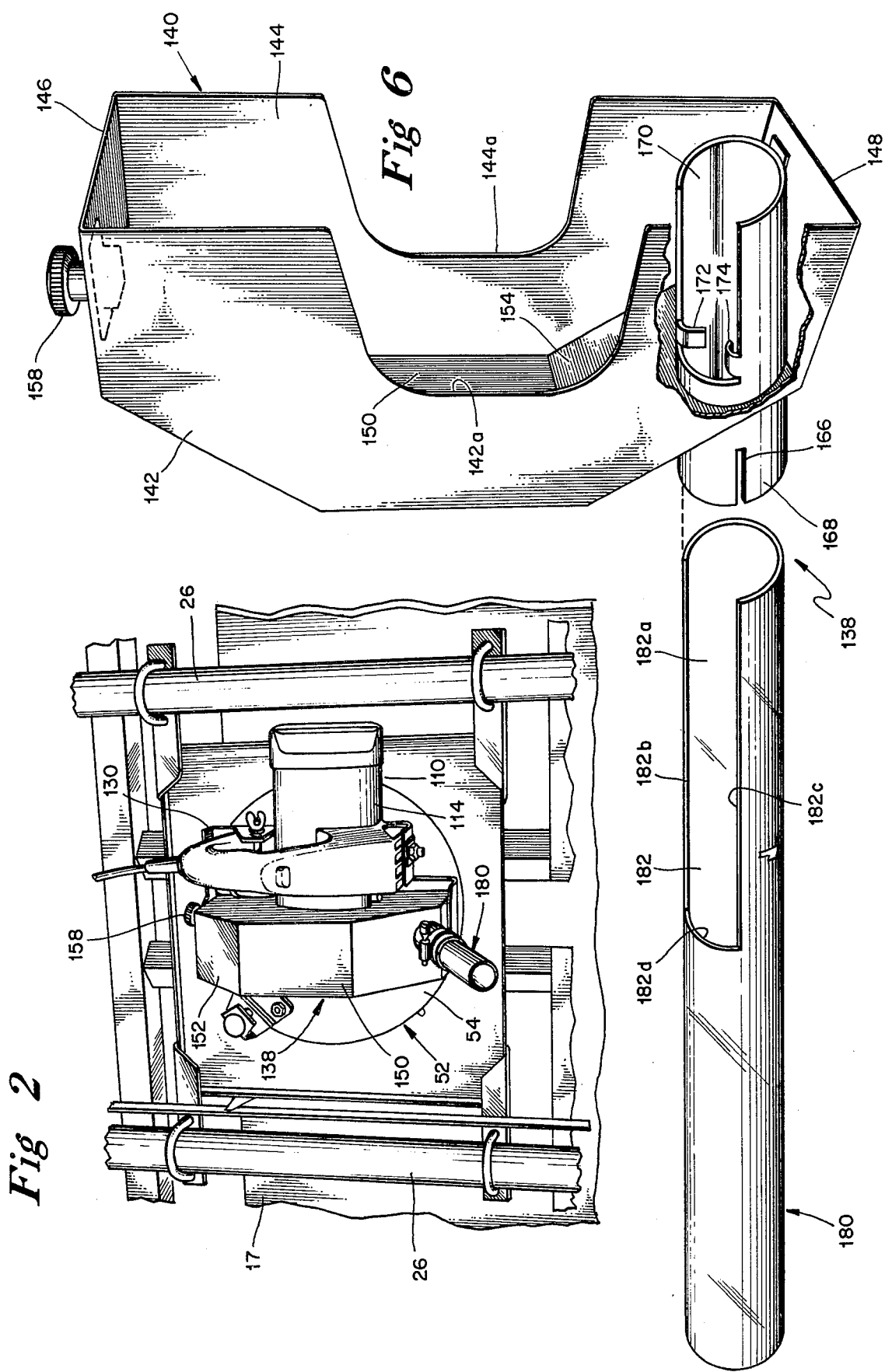
FIG. 2 is an enlarged perspective view of the dust collecting apparatus corresponding substantially to the way it appears in FIG. 1, the view being at a slightly different angle and depicting only a fragmentary portion of the sheet board cutting machine of FIG. 1.

Although my invention can be used with radial arm saws, and even hand-held or portable power saws, nonetheless my invention finds especial utility when employed in conjunction with a so-called panel saw. Actually, it will facilitate an understanding of the present invention to refer to U.S. Pat. No. 3,565,139 granted on Feb. 23, 1971 to Eugene T. Olson for "Angularly Shiftable Saw Mount". It is believed that it will help to even employ some of the same reference numerals utilized in said patent.

Therefore, as can be seen in FIG. 1, the sheet board cutting machine has been denoted generally by the reference numeral 10. The illustrated machine 10 includes a truncated A-frame 12 with wheels 14 thereon so as to permit the frame 12 to be moved from place to place. The frame 12 includes a horizontal bottom channel member 16 containing rollers (not visible) on which a panel board 17 may be advanced when making a horizontal saw cut. The frame 12 additionally includes horizontal members 18 at different vertical elevations, and a pair of inclined bars 20. Still further, a top bar 22 supports a counterbalancing mechanism 24. Also, the machine 10 comprises a pair of spaced vertical standards or tracks 26 which form a guide for the saw mount indicated generally by the reference numeral 28.

The saw mount 28 is fully described in the afore-mentioned U.S. Pat. No. 3,565,139 and need not be redescribed herein. However, it will assist in appreciating the benefits of the present invention to note that the saw mount carries thereon a turntable assembly 52 composed of a front circular disc 54 and a back circular disc 56, each discs 54, 56 having a rectangular opening therein which permits the circular saw blade yet to be referred to to project therethrough when making a cut in the panel board 17.

Figure 3:
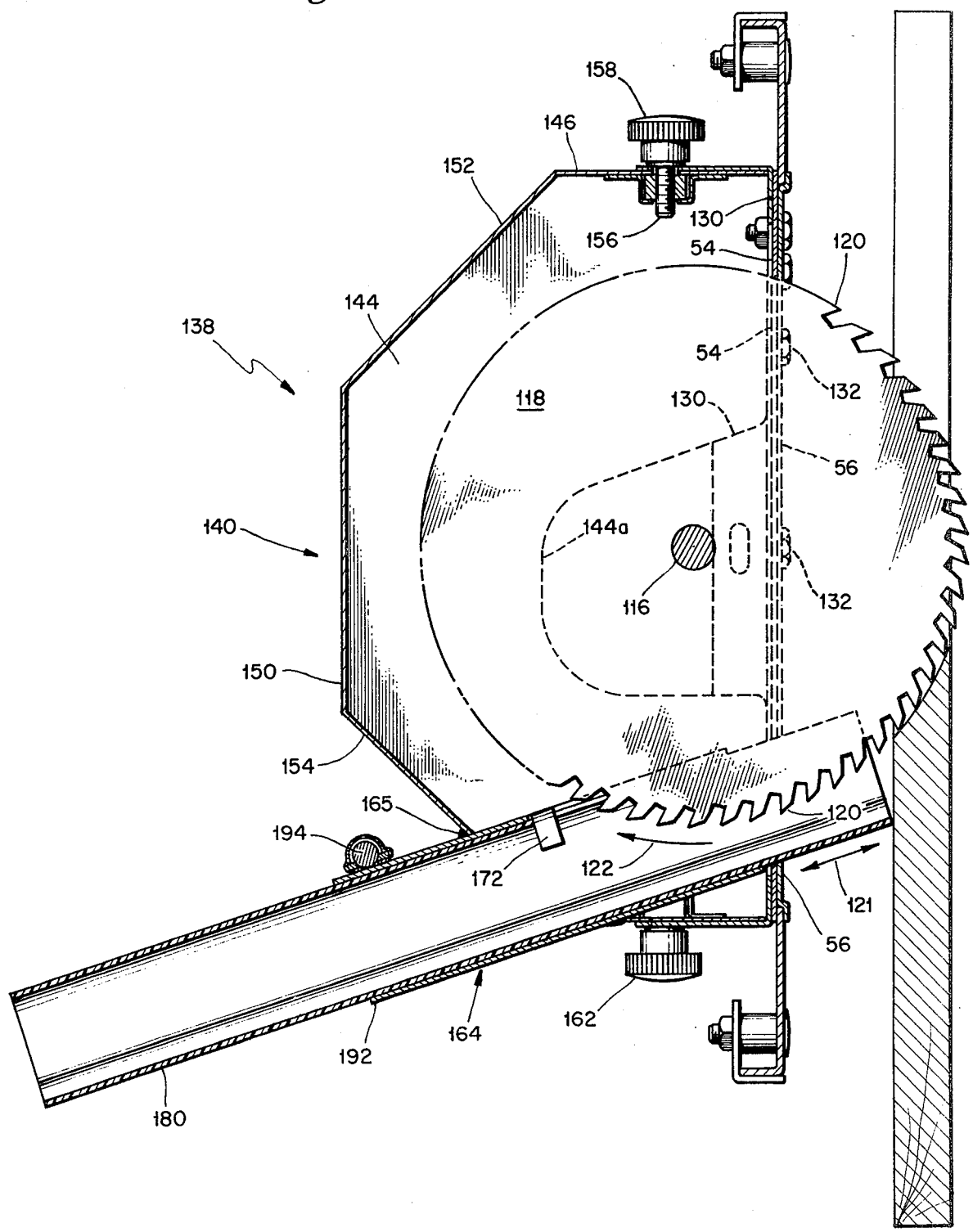
FIG. 3 is a vertical sectional view taken in the direction of line 3—3 of FIG. 1 and FIG. 2 for the purpose of depicting the circular blade in relation to the slotted tube for removing the sawdust as it is produced by the rotating blade.
Figure 4:
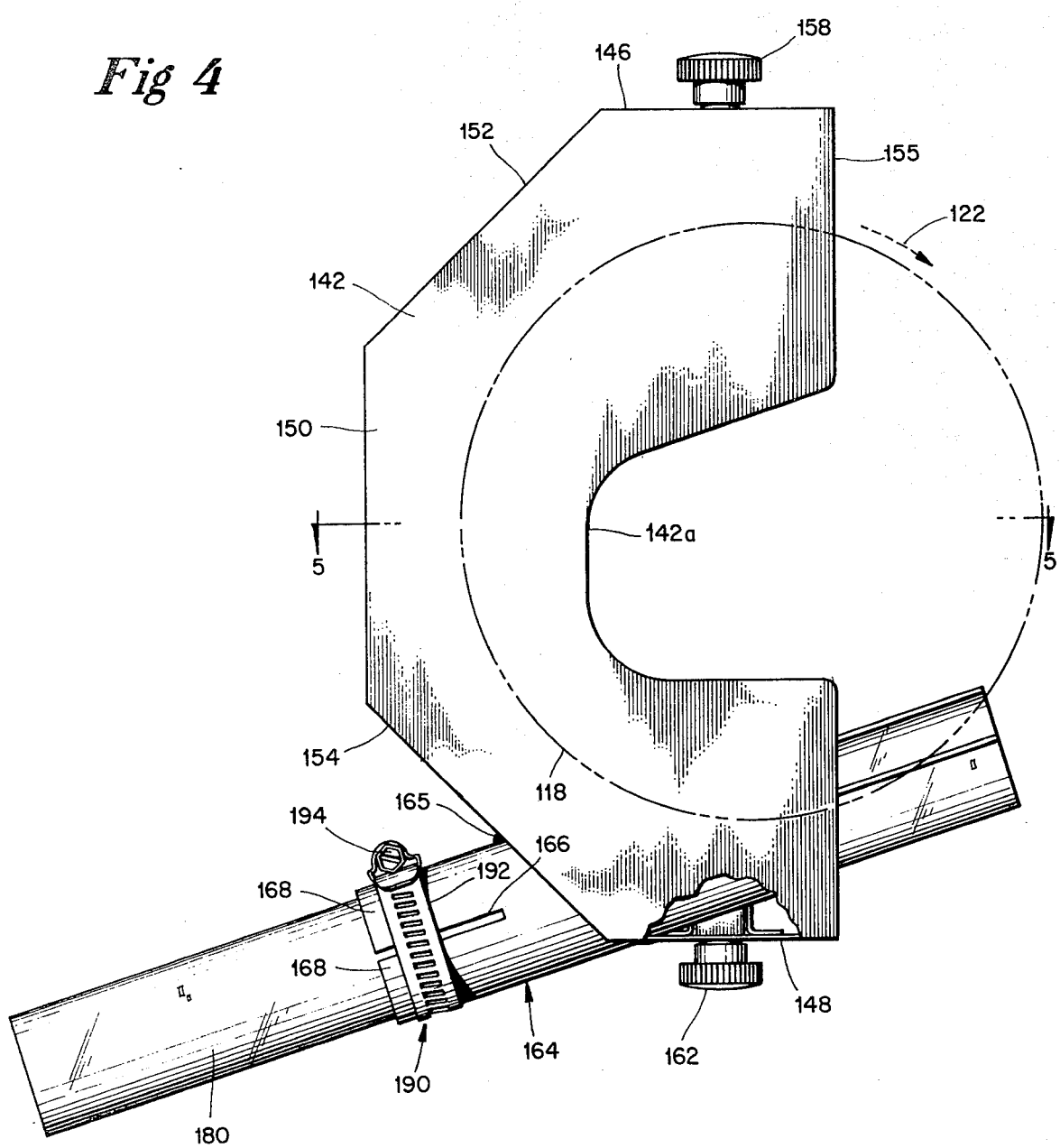
FIG. 4 is a side elevational view of apparatus exemplifying my invention, the circular blade being shown in phantom outline so that the relation of the blade with respect to my apparatus can be readily comprehended.
Figure 5:
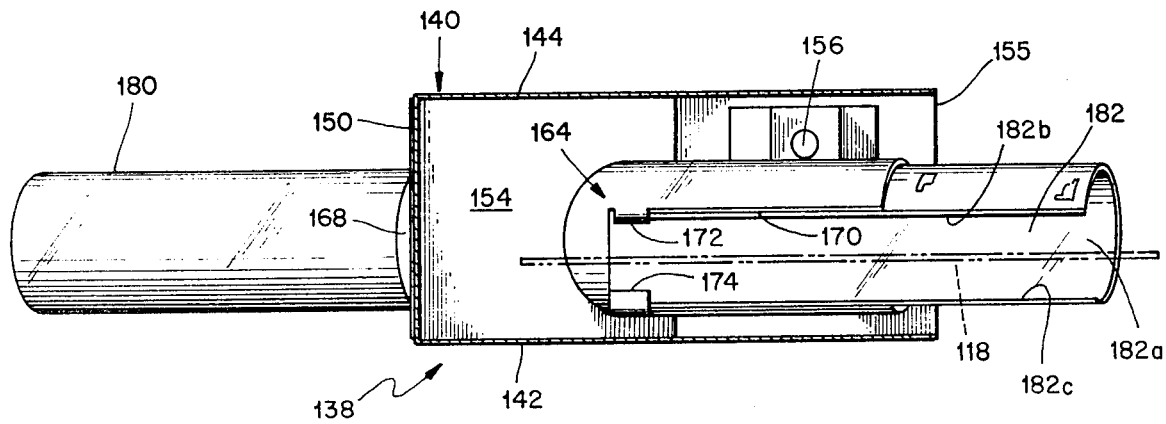
FIG. 5 is a horizontal sectional view taken in the direction of line 5—5 of FIG. 3, the blade once again being depicted in phantom outline so as to illustrate to better advantage the relationship of the blade with respect to parts of the dust collecting apparatus.

An electrically powered circular saw has been denoted generally by the reference numeral 110. The saw 110 includes an electric motor 114. The motor shaft 116 has mounted thereon a circular saw blade 118 having peripherally disposed teeth 120. The electric motor 114 causes the blade 118 to rotate in the direction of the arrow 122, as indicated in FIG. 3, the arrow also being shown in dotted form in FIG. 4 inasmuch as the blade 118 appears in phantom outline in this view.

A conventional saw foot 130 is secured to the front face of the turntable assembly 52, more specifically confronting the circular disc 54. Suitable bolts 132 secure the saw foot 130 to the turntable assembly 52. Additional bolts fasten the motor 114 to the saw foot 130. In this way, the circular saw 110 via its motor 114 is attached to the turntable assembly 52 and is rotatable therewith so as to effect a vertical cut when the saw mount 28 is moved downwardly in FIG. 1. When the turntable assembly 52 is rotated through 90°, then the blade 118 resides in a horizontal plane and the movement of the panel board 17 along the bottom channel 16 on the rollers (not visible) will under these conditions produce a horizontal saw cut. It should be mentioned at this stage of the description that my invention does not in any way interfere with the making of vertical and/or horizontal cuts.

Turning now to a description of the dust collecting apparatus exemplifying my invention, it will be pointed out that the apparatus has been denoted in its entirety by the reference numeral 138. While guard casings have been utilized in the past, the guard casing comprising part of the apparatus 138 has been indicated generally by the reference numeral 140. It is intended that the casing 140 be fabricated from sheet metal. More specifically, the sheet metal guard casing 140 includes parallel side panels 142 and 144, the side panel 142 having an opening or large notch 142a formed therein, whereas the other side panel 144 has a similarly configured opening or notch 144a. The casing 140 further includes top and bottom panels 146 and 148, respectively, and a vertical back panel 150. Connecting the upper edge of the back panel 150 to the top panel 146 is an inclined panel 152; somewhat similarly, an inclined panel 154 connects the lower edge of the back panel 150 to the bottom panel 148. Whereas the rear of the casing 140 is closed, the front of the casing is completely open as indicated by the reference numeral 155.

It will be perceived that the top panel 146 of the casing 140 has an upper mounting bolt 156, the bolt 156 having a torque knob 158 by means of which the bolt 156 can be twisted or rotated. By the same token, the bottom panel 148 has a second bolt (not visible) provided with a torque knob 162 thereon. By means of the knobs 158 and 162, more specifically the bolts attached thereto, the casing 140 can be attached to and detached from the saw foot 130.

Whereas the guard casing 140 up to this point is typical of conventional guard casings, it is modified appreciably so as to enable my invention to be employed. In this regard, a cylindrical sleeve 164 extends through the lower inclined panel 154 and partially through the bottom panel 148. Initially, an appropriately configured opening is cut in these two panels 148 and 154 so as to receive a portion of the cylindrical sleeve 164. The sleeve 164 is welded at 165 in order to permanently and integrally mount the sleeve 164 in place. The rearwardly projecting end portion of the sleeve 164 has a plurality of angularly spaced slits 166 formed therein which provide a number of resilient clamping fingers 168. The other end portion of the sleeve 164, that is, the portion residing within the confines of the casing 140 between the side panels 142 and 144, has a rectangular slot 170 cut therein. In cutting the slot 170, a pair of ears 172, 174 are formed and are bent downwardly and inwardly so as to provide limit stops for a purpose presently to be made manifest.

Playing an extremely important role in the practicing of my invention is a cylindrical tube 180 of transparent plastic, preferably of polycarbonate which is tough and which is scratch resistant. The cylindrical tube 180 has a rectangular slot 182 extending from one end thereof. More specifically, the slot 182 has an open end 182a, parallel side edges 182b and 182c, and a closed end 182d, the closed end 182d having the ears 172, 174 closely adjacent thereto.

Owing to the resiliency of the clamping fingers 168, the cylindrical tube 180 can be adjustably positioned so as to be closely adjacent the blade 118. A conventional hose clamp 190 is employed having a flexible band 192 that can be contracted about the fingers 168 by merely tightening a screw 194. Consequently, once the cylindrical tube 180 is properly positioned within the integral sleeve 164, it can be held in this position.

It can be pointed out at this stage of the description that the inturned ears 172, 174 prevent the tube 180 from being moved too far inwardly because the closed end 182d of the rectangular slot 182 strikes the inturned ears 172, 174 to prevent further movement. More importantly perhaps is the fact that the inturned ears 172, 174 also prevent any inadvertent rotation of the cylindrical tube 180 which in one direction would cause the side edge 182b to bear against the circular saw blade 118 and if twisted in an opposite direction the side edge 182c to bear against the saw blade 118.

The end of the tube 180 projecting beyond the integral sleeve 164 enables a flexible hose 200 which is draped over a yieldable pulley support 202 mounted on the truncated A-frame 12 to be utilized. The flexible hose 200 is of indeterminant length, being long enough so as to reach to a tank-type vacuum cleaner or vacuum source 204. Inasmuch as the saw mount 28 is to be moved upwardly and downwardly, it follows that the flexible hose 200 must be of adequate length to permit freedom of vertical movement.

Having presented the foregoing description, the manner in which my apparatus 138 functions should be readily understandable. Even so, in order to assure a full understanding of the benefits to be derived from a practicing of my invention, it can be explained at this point that the cylindrical tube 180, when the clamp 190 is loosened, can be moved axially within the integral sleeve 164 in either direction as indicated by the double-headed arrow 121 so as to position the end of the tube 180 in close proximity with the board 17 (see FIG. 3). It will be appreciated that the saw blade 118 is rotated in the direction of the arrow 122 so that the sawdust resulting from the making of a saw cut will be literally kicked into the tube 180 by reason of the direction in which the saw teeth 120 are moving. Since the cross section of the cylindrical tube 180 is fairly small, it should be understood that the vacuum or low pressure condition created by the vacuum cleaner 204 is effective to induce the sawdust to move through the tube 180 once it has entered this tube. It then continues through the flexible hose 200 to the vacuum cleaner 204.

Inasmuch as horizontal cuts are also to be made with the sheet cutting machine 10, this being when the turntable assembly 52 is rotated through 90°, it should be appreciated that the apparatus 138 which is mounted in a fixed relation on the turntable assembly 52 simply rotates with the turntable and the table 180 assumes a horizontal position when the saw blade 118 is horizontal. Consequently, irrespective of the angularity of the circular disc saw 110, the removal of the sawdust via the tube 180 is always accomplished.

I claim:

1. Dust collecting apparatus for circular power saws comprising a guard casing for enclosing a substantial portion of the power saw's circular blade, an integral sleeve fixedly attached to and supported by said casing, a tube having a circular cross section, said tube being slidably received in said sleeve so that one end of said tube can be adjustably positioned relative to said circular blade, the other end of said tube being adapted for connection to a vacuum source, said tube having a rectangular slot extending longitudinally from said one end thereof for accommodating therein a peripheral segment of said blade and said sleeve having a rectangular slot corresponding generally to the sides of the slot in said tube, and means on said sleeve limiting longitudinal movement of said tube in the direction of said circular blade, whereby an appreciable amount of sawdust produced by said blade is directed into said tube and induced to flow therethrough by said vacuum source.

2. Apparatus in accordance with claim 1 in which said limiting means includes a pair of inturned ears preventing angular rotation of said tube within said sleeve, said ears also limiting said longitudinal movement of said tube in the direction of the circular saw blade.

3. Apparatus in accordance with claim 2 in which said tube is of transparent material.

4. Apparatus in accordance with claim 3 in which said tube is of polycarbonate plastic material.

5. Dust collecting apparatus for circular power saws comprising a guard casing for enclosing a substantial portion of the power saw's circular blade, an integral sleeve fixedly attached to said casing, a tube having a circular cross section, said tube being slidably received in said sleeve so that one end of said tube can be adjustably positioned relative to said circular blade, the other end of said tube being adapted for connection to a vacuum source, said tube having a slot extending longitudinally from said one end thereof for accommodating therein a peripheral segment of said blade, said sleeve having a plurality of angularly spaced longitudinal slits forming resilient fingers for gripping said tube, and clamping means for urging said fingers against said tube to hold said tube in an adjusted position relative to the circular saw blade.

* * * * *

UNITED STATES PATENT OFFICE
CERTIFICATE OF CORRECTION

Patent No. 4,253,362        Dated   March 3, 1981

Inventor(s)    Larry E. Olson

It is certified that error appears in the above-identified patent and that said Letters Patent are hereby corrected as shown below:

Column 1, line 26, the word "exists" should be changed to --exits--.

Signed and Sealed this

Nineteenth Day of May 1981

[SEAL]

Attest:

RENE D. TEGTMEYER

Attesting Officer    Acting Commissioner of Patents and Trademarks